(12) United States Patent
Thomas

(10) Patent No.: US 6,565,758 B1
(45) Date of Patent: May 20, 2003

(54) SYSTEMS AND METHODS FOR DISPENSING, COLLECTING AND PROCESSING WASH FLUID

(75) Inventor: Gordon Thomas, Paris, TX (US)

(73) Assignee: The Centech Group, Inc., Arlington, VA (US)

( * ) Notice: Subject to any disclaimer, the term of this patent is extended or adjusted under 35 U.S.C. 154(b) by 73 days.

(21) Appl. No.: 09/813,276

(22) Filed: Mar. 21, 2001

Related U.S. Application Data

(60) Provisional application No. 60/190,927, filed on Mar. 21, 2000, and provisional application No. 60/190,940, filed on Mar. 21, 2000.

(51) Int. Cl.$^7$ .............................................. B01D 37/00
(52) U.S. Cl. .................. 210/776; 210/805; 210/806; 210/167; 210/248; 210/251; 210/252; 210/257.2; 210/258; 210/416.1; 210/652; 210/802; 222/109; 222/189.06; 134/10; 134/21; 134/117
(58) Field of Search .................. 210/776, 805, 210/806, 167, 248, 251, 252, 257.2, 258, 416.1, 652, 802; 134/10, 21, 117; 222/108, 109, 189.06

(56) References Cited

U.S. PATENT DOCUMENTS

| | | |
|---|---|---|
| 4,191,348 A | 3/1980 | Holwerda |
| 4,279,263 A | 7/1981 | Pulliam |
| 5,028,017 A | 7/1991 | Simmons et al. |
| 5,090,588 A | 2/1992 | Van Romer et al. |
| 5,244,168 A | 9/1993 | Williams |
| 5,330,579 A | 7/1994 | Rushing et al. |
| 5,374,352 A | 12/1994 | Pattee |
| 5,423,339 A | 6/1995 | Latimer |
| 5,462,655 A | 10/1995 | Ladd et al. |
| 5,547,312 A | 8/1996 | Schmitz, Jr. |
| 5,560,782 A | 10/1996 | Latimer |
| 5,597,001 A | 1/1997 | Rasmussen et al. |
| 5,669,982 A | 9/1997 | Latimer |
| 5,755,404 A | 5/1998 | Numbers |
| 5,797,994 A | 8/1998 | Rasmussen |
| 5,858,111 A | 1/1999 | Marrero |
| 5,899,217 A | 5/1999 | Testman, Jr. |
| 5,979,001 A | 11/1999 | Marrero |
| 6,047,926 A | 4/2000 | Stanko et al. |
| 6,134,734 A | 10/2000 | Marrero |

FOREIGN PATENT DOCUMENTS

| | | |
|---|---|---|
| GB | 2 228 558 | 8/1990 |

*Primary Examiner*—Robert J. Popovics
(74) *Attorney, Agent, or Firm*—Pillsbury Winthrop LLP

(57) ABSTRACT

A system for dispensing, collecting, and processing wash fluid includes a first movable support frame including a first tank that stores clean wash fluid, a first pump that pressurizes the clean wash fluid and delivers the pressurized wash fluid to a dispenser, a second tank that stores used wash fluid, and at least one of a separator unit and a reverse osmosis unit that process used wash fluid delivered from the second tank. A second movable support frame includes a used washed fluid collection area and a second pump at one end that transfers the collected wash fluid back to the second tank of the first movable support frame through a conduit. The second movable support frame also includes an inclination adjustment mechanism that adjusts the inclination of the second movable support frame so that the collected fluid is supplied to the second pump. A method for dispensing, collecting, and processing wash fluid dispensing wash fluid from a first movable support frame, collecting used wash fluid in a collection area of a second movable support frame, adjusting an inclination of the second movable support frame, transferring the used wash fluid from the second movable support frame to the first movable support frame, and processing the used wash fluid into clean wash fluid.

18 Claims, 3 Drawing Sheets

SYSTEMS AND METHODS FOR DISPENSING, COLLECTING AND PROCESSING WASH FLUID

CROSS REFERENCE TO RELATED APPLICATIONS

This application claims priority from U.S. Applications Nos. 60/190,927 and 60/190,940, both filed Mar. 21, 2000 the contents of which are herein incorporated by reference.

BACKGROUND OF THE INVENTION

1. Field of the Invention

This invention relates to systems and methods for dispensing, collecting, and processing wash fluid, in particular wash fluid used for washing engines, and more particularly, aircraft engines, and even more particularly, aircraft jet engines.

2. Description of Related Art

The interiors of aircraft engines are washed to remove the products of combustion, uncombusted fuel, lubricants, and other particulate matter that are introduced and accumulated in the engine during use. Public airports may include a drainage system that directs used wash fluid to a treatment or processing facility that processes the used wash fluid to remove contaminants so that the processed fluid meets certain environmental regulations before being released to a sewerage system. Public airports and military facilities including airbases, however, may be located in regions remote from accessible water treatment facilities and may lack drainage systems for collection and storage of used wash fluid. The used wash fluid must therefore be collected before contacting the ground to prevent pollution and contamination of the military facility and/or surrounding area. The used wash fluid must then be processed to a level suitable for disposal in a sewerage system.

U.S. Pat. Nos. 5,423,339, 5,560,782 and 5,669,982 to Latimer disclose a mobile apparatus including a truck and trailer unit having a high pressure pump for dispensing wash water, a water heater, and a submersible pump that collects used wash water from a flexible wash pad that collects the used wash water. The used wash water is sent to a water treatment unit that separates oil, particulates, heavy metals, pesticides, and hydrocarbons from the used wash water.

The wash pad of U.S. Pat. Nos. 5,423,339, 5,560,782 and 5,669,982 weighs in excess of 350 pounds and requires at least two operators to unfold and set up. The area in which the wash pad is unfolded must be free of all debris and sharp objects, which may require the operators to perform a time consuming cleaning operation prior to setting up the wash pad. The wash pad may also be damaged when the aircraft is moved over the berm, or side, of the wash pad. Damage to the wash pad may result in release of used wash fluid from the wash pad and subsequent contamination of the surrounding area. In addition, the wash pad may be disturbed by winds that may cause release of collected used wash fluid or damage to the wash pad unless the wash pad is staked down by the operators.

In the event that the wash pad of U.S. Pat. Nos. 5,423,339, 5,560,782 and 5,669,982 is used in an area of uneven terrain, the used wash fluid may collect in an area where the submersible pump is unable to remove the used wash fluid. The operator would then be required to move the submersible pump to places where wash fluid is collected.

U.S. Pat. No. 5,597,001 to Rasmussen et al. discloses a portable equipment wash station including a container that stores cleaning equipment, generators, holding tanks for water and fuel, recycling equipment including filters, settling tanks and separation equipment for processing used wash fluid, and a retractable flooring. A sump pump collects the used wash fluid from the retractable flooring. The container may be transported by a train car, a semi-trailer, or ship.

The wash station of U.S. Pat. No. 5,597,001 is similar to the apparatus of U.S. Pat. No. 5,560,782 in that it requires operators to perform a time consuming operation to set up the retractable flooring. In addition, the retractable flooring may be damaged by vehicles entering the flooring over the berm. A plurality of access ramps and track strips must then be set up to allow a vehicle to enter and exit the flooring.

U.S. Pat. No. 5,462,655 to Ladd et al. discloses a vehicle containment mat including a vacuum recovery and recycling system that captures residual waste fluids generated during airplane washing or de-icing procedures. A vacuum pump passes the waste fluid to a storage tank for temporary storage. The waste fluid is then passed to a hydro cycle machine that separates the water from other fluids and particulate matter and the separated water is passed to a reverse osmosis tank where residual impurities are removed.

The system of U.S. Pat. No. 5,462,655 is not portable and requires that the airplane or other vehicle be brought to the containment mat. In addition, the containment mat suffers all of the drawbacks of the mat of U.S. Pat. Nos. 5,423,339, 5,560,782 and 5,669,982 in that it may be easily damaged by vehicles entering or exiting the mat and by debris. The containment mat may also be affected by strong winds that may lead to spillage of the collected used wash fluid and/or damage to the containment mat.

U.S. Pat. No. 5,899,217 to Testman, Jr. discloses an engine wash recovery system that is temporarily installed on an aircraft turbine engine to recover wash liquids and contaminants. The system includes a collector formed of a flexible, liquid proof material, an engine exhaust duct, and a container. The collector collects all liquids emanating from the engine and its housing during the wash process.

The system of U.S. Pat. No. 5,899,217 is difficult to set up as it requires that the operator strap the collector to the engine and connect a drain hose and the exhaust duct to the container. The collector may be damaged while it is being secured to the engine and leak wash fluid into the surrounding area.

U.S. Pat. No. 5,330,579 to Rushing et al. discloses an apparatus and method for spent solvent collection for collecting solvents used to strip coatings, including paint, off vehicles, such as aircraft. The system includes a receptacle having spaced side walls and defining a receptacle bottom portion, the side walls directing spent solvent in both liquid and gas phases to the receptacle bottom portion such that the vapor phase is trapped above the heavier liquid phase. An exhaust port is provided above the receptacle bottom portion for removing the vapor phase. The liquid solvent is not continuously drained by a centralized system but the receptacles are individually drained as the liquid solvent level of each receptacle becomes too high. The liquid solvent is removed for subsequent purification and reuse.

SUMMARY OF THE INVENTION

There exists a need for a system for cleaning aircraft engines that dispenses wash fluid, collects used wash fluid and processes the used wash fluid to a level safe for disposal into a public sewerage system that is more easily set up and in a less time consuming manner than conventional systems.

In addition, there exists a need for a system that dispenses, collects and processes wash fluid that is safer than conventional systems by reducing the possibility of the collected used wash fluid leaking from the containment area. There also exists a need for a system that dispenses, collects and processes wash fluid that includes an apparatus for collecting used washed fluid and transferring the used wash fluid to a processing system that is more reliable and easier to operate than conventional systems.

Accordingly, one aspect of the present invention is a system for dispensing, collecting and processing wash fluid that includes a collection apparatus that is easily set up in a relatively short time by a single operator.

Another aspect of the present invention is a system for dispensing, collecting and processing wash fluid that includes a collection apparatus that reduces the possibility of used wash fluid leaking from the collection apparatus.

Yet another aspect of the present invention is a system for dispensing, collecting and processing wash fluid that includes an apparatus that reliably and easily collects and transfers used wash fluid from a containment and collection area to a processing area.

A system for dispensing, collecting, and processing wash fluid according to an exemplary embodiment of the present invention includes a first movable support frame including a first tank that stores clean wash fluid, a first pump that pressurizes the clean wash fluid and delivers the pressurized wash fluid to at least one dispenser, a second tank that stores used wash fluid, and at least one of a separator unit and a reverse osmosis unit that processes used wash fluid delivered from the second tank into clean wash fluid. A second movable support frame includes a used washed fluid collection area and a second pump at one end that transfers the collected wash fluid from the collection area to the second tank of the first movable support frame through a conduit. The second movable support frame also includes an inclination adjustment mechanism that adjusts the inclination of the second movable support frame so that the collected fluid is supplied to the second pump.

A method for dispensing, collecting, and processing wash fluid according to a first exemplary embodiment of the invention dispensing clean wash fluid from a first movable support frame, collecting used wash fluid in a collection area of a second movable support frame, adjusting an inclination of the second movable support frame, transferring the used wash fluid from the second movable support frame to the first movable support frame, and processing the used wash fluid into clean wash fluid.

BRIEF DESCRIPTION OF THE DRAWINGS

Various exemplary embodiments of the present invention will be described in relation to the accompanying drawings, wherein like reference numbers denote like features, in which.

DETAILED DESCRIPTION OF EXEMPLARY EMBODIMENTS OF THE INVENTION

Figure 1:
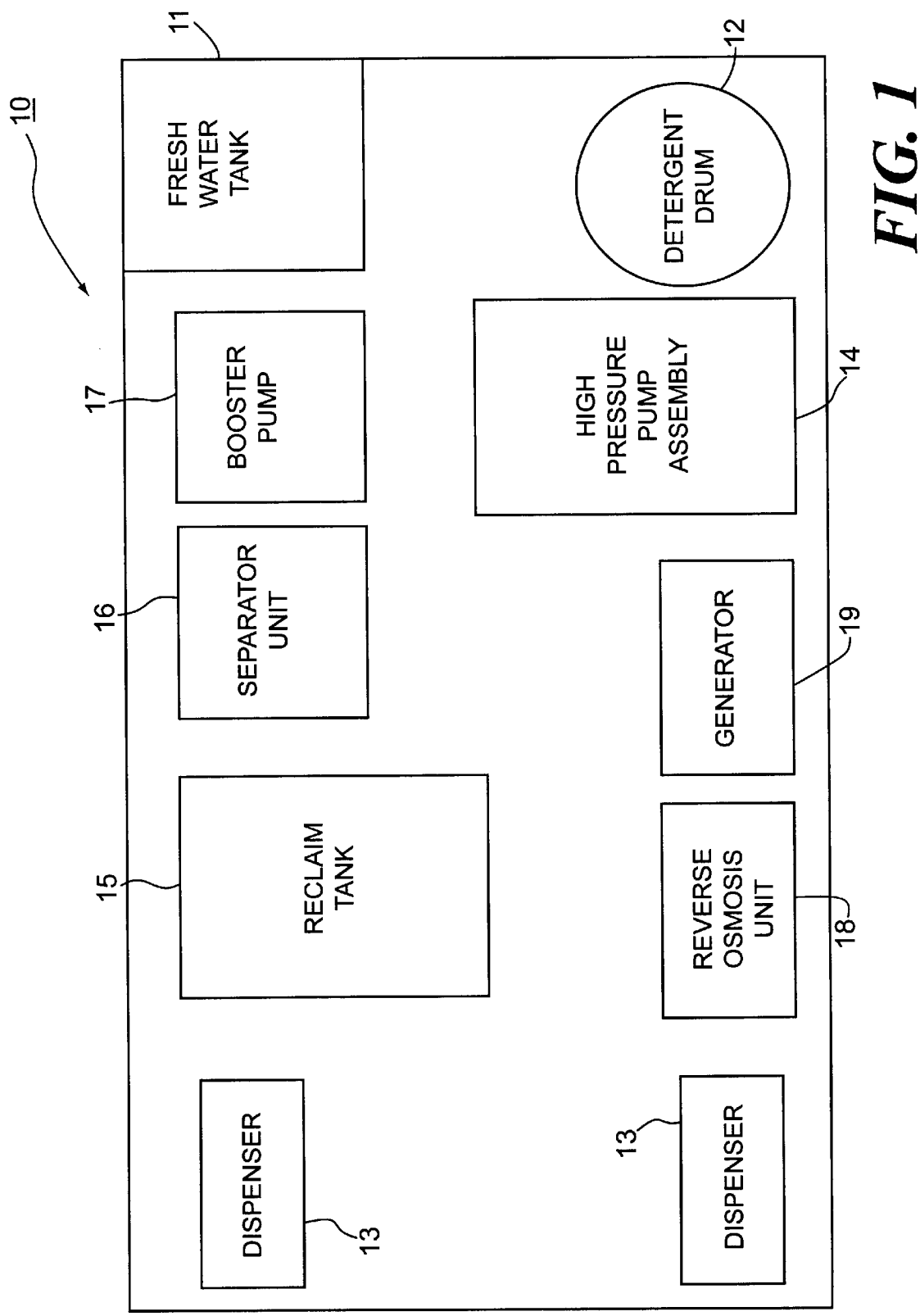
FIG. 1 schematically illustrates a first movable support frame according to an exemplary embodiment of the invention.
Figure 2:
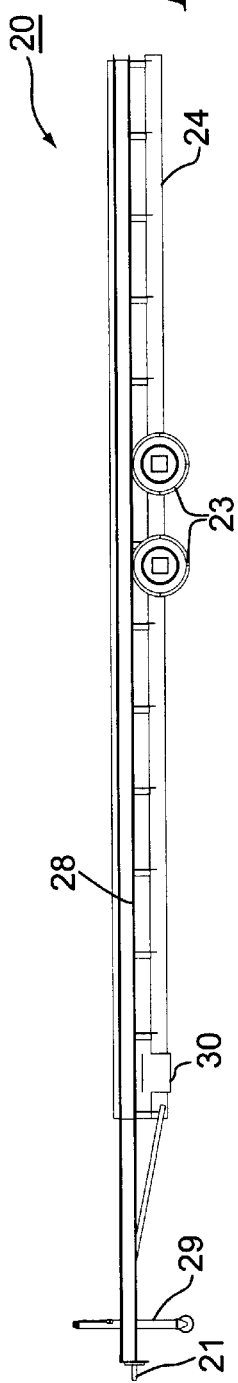
FIGS. 2, 3 and 4 are side, front, and bottom views of a second movable support frame according to the invention.
Figure 4:
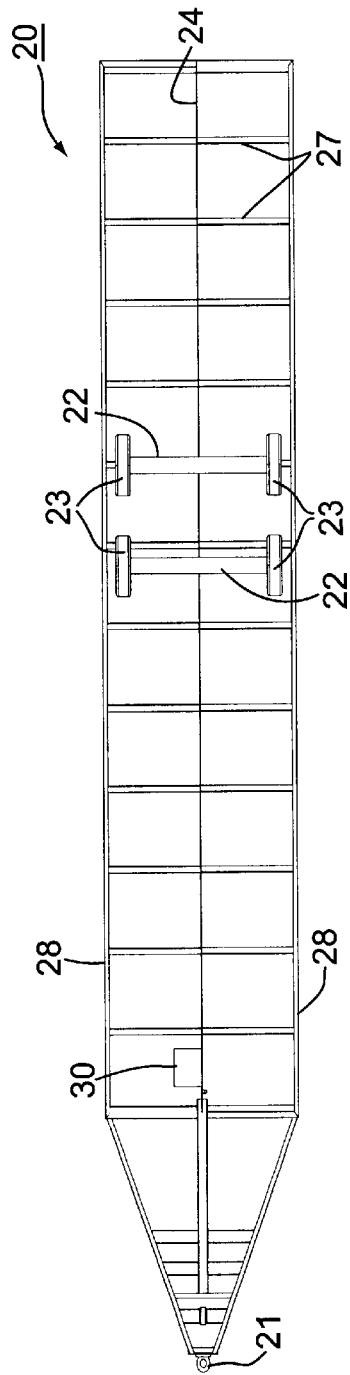
Figure 3:
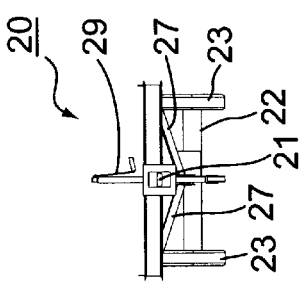
Figure 5:
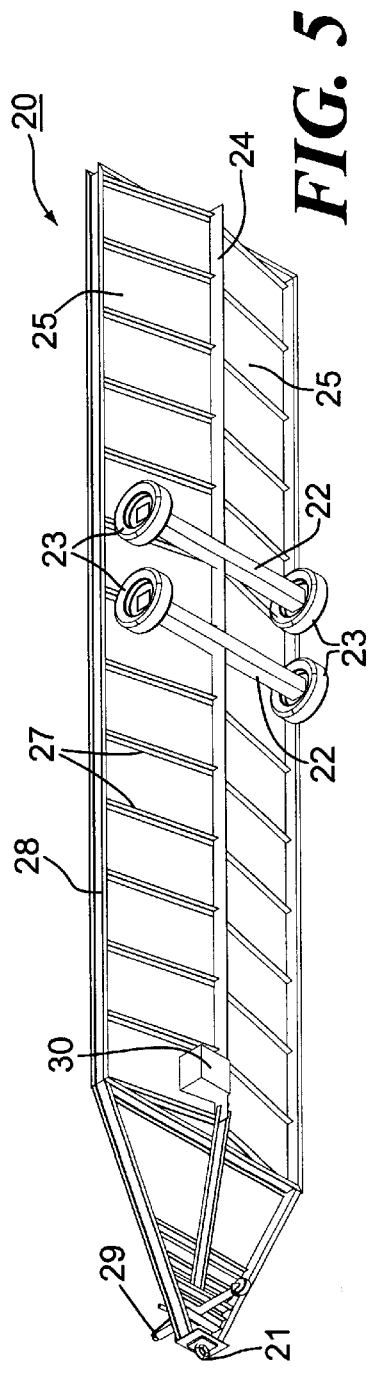
FIG. 5 is a bottom perspective view of the second movable support frame.
Figure 6:
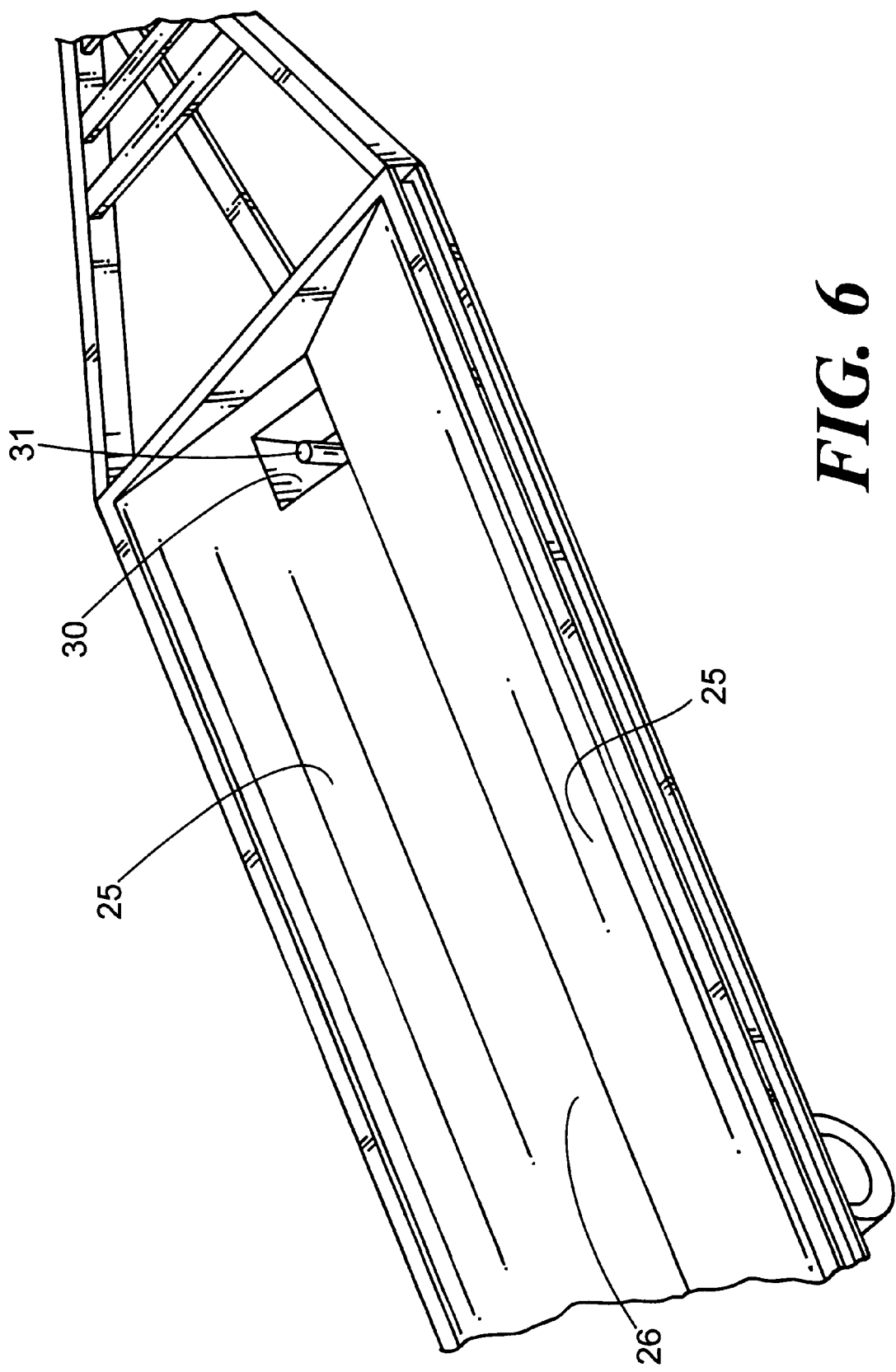
FIG. 6 is a top perspective view of a portion of the second movable support frame.

Referring to FIG. 1, a first movable support frame 10 of a system for dispensing, collecting, and processing wash fluid according to the invention includes a fresh water tank 11 and a detergent drum 12. The fresh water tank 11 and the detergent drum 12 are both connected to a high pressure pump assembly 14 that draws fresh water from the fresh water tank 11 and detergent from the detergent drum 12. The high pressure pump assembly 14 mixes the fresh water and the detergent together, pressurizes the mixture and delivers the mixture to a dispenser 13. The dispenser 13 may be a high pressure spray wand connected to a hose stored on a hose reel, that may be a self winding reel. The spray wand may be connected to the hose by a connector. A brush, for example a rotating brush, may also be connected to the hose and/or the spray wand.

The first movable support frame 10 may be a trailer and include at least one axle and a pair of outboard wheels. The first movable support frame 10 may also be incorporated into a vehicle, for example, the first movable support frame 10 may be the flatbed of a truck. As another example, for use in areas with heavy snow accumulation, the first movable support frame 10 may be a sled, including skis, and may be powered by its own engine and propulsion system, or may be connected to a vehicle adapted for travelling over snow.

The first movable support frame 10 also includes a reclaim tank 15 that accepts used wash fluid collected by a second movable support frame (described later). A separator unit 16 that includes a pump draws the used wash fluid from the reclaim tank 15 and processes the used wash fluid through a multi-stage filtering process. The separator unit 16 may be a commercially available unit provided by Waste Water Technologies, Inc. of California. The separator unit 16 may also be provided with CELL-PORE® canister filters provided by Cercona of America of Dayton, Ohio. The canister filters may be glass foam, for example in the form of pellets, and may be coated with amorphous iron oxide (FeOOH) to increase the canister filters absorption of heavy metals.

The separator unit 16 includes coalescing plates for removing oil droplets that flow through the unit 16. The separator unit 16 may also include a skimmer to collect the oil. The separator unit 16 includes higher density coalescing plates for removing smaller oil particles and polypropylene filter bags for further removal and absorption of oil particles. Polishing filters may be provided for removal of particles as small as 10 and 5 microns and charcoal filters may be provided to remove color and petroleum hydrocarbons.

A booster pump 17 pressurizes the wash fluid processed by the separator unit 16 and delivers it to a reverse osmosis unit 18. The reverse osmosis unit 18 may be a CB Series Reverse Osmosis System available from Systems USA, Inc. of Vista, Calif. The reverse osmosis unit 18 removes particulate matter not removed by the separator unit 16 and includes a pump at the top of the unit 18 that sends a reject stream back to the separator unit for reprocessing through the separator unit 16 and the reverse osmosis unit 18.

The high pressure pump assembly 14, the pump in the separator unit 16, the booster pump 17, and the pump in the reverse osmosis unit 18 are powered by a generator 19.

Referring to FIGS. 2–6, a second movable support frame 20 of a system for dispensing, collecting, and processing wash fluid according to the invention includes an attachment member 21 that attaches to the first movable support frame 10 or to a vehicle. The second movable support frame, like the first movable support frame, may be a trailer and include at least one axle 22 and a pair of outboard wheels 23. The second movable support frame 20 may also be incorporated into a vehicle, for example, the flatbed of a truck. As discussed above with respect to the first movable support frame 10, the second movable support frame 20 may be adapted to travel over any terrain.

The second movable support frame 20 includes a longitudinal member 24 and a pair of inclined wall or panel members 25 that define a used wash fluid collection area 26. Each panel members 25 may be supported by a plurality of transverse support members 27 that extend between the longitudinal member 24 and longitudinal frame members 28. It should also be appreciated that each panel member 25 may be a plurality of panel members corresponding to the number of spaces defined between the transverse support members 27.

The second movable support frame 20 also includes an inclination adjustment mechanism 29 at one end that adjusts the inclination of the second movable support frame 20. The inclination adjustment mechanism 29 may be a screw thread, a hydraulic or pneumatic cylinder, or any other suitable mechanism.

A receptacle 30 is provided on the same end of the second movable support frame 20 as the inclination adjustment mechanism 29. The receptacle may, however, be provided on the opposite end of the second movable support frame 20. A pump 31 is provided in the receptacle 30. The pump 31 is a self activated pump, such as a sump pump. A conduit (not shown), for example a flexible hose, is connected between the pump 31 and the reclaim tank 15 of the first movable support frame 10.

In operation, the second movable support frame 20 is positioned beneath an engine to be cleaned. The second movable support frame 20 may be towed into position beneath the engine in the event that the second movable support frame 20 is not self propelled. The operator merely positions the second movable support frame 20 under the engine to be cleaned and proceeds to position the first movable support frame 10 close to the engine. The operator connects the conduit from the reclaim tank 15 to the pump 31. The operator then starts the generator and may proceed to dispense wash fluid (fresh water from tank 11 and drum 12) to clean the engine. Used wash fluid from the engine is collected in the collection area 26 of the second movable support frame 20 positioned beneath the engine.

As used washed fluid is collected in the collection area 26 of the second movable support frame 20 the fluid eventually flows to the receptacle 30 and activates the pump 31. The used wash fluid is then pumped to the reclaim tank 15 of the first movable support frame 10 for processing through the separator unit 16 and the reverse osmosis unit 18. Wash fluid processed by the separator unit 16 and the reverse osmosis unit 18 is then delivered to the fresh water tank 11 for reuse as wash fluid.

In the event that the second movable support frame 20 is placed on uneven terrain, the operator may adjust the inclination of the second movable support frame 20 by using the inclination adjustment mechanism 29. The operator may also adjust the inclination of the second movable support frame 20 at the end of the wash process to ensure that all of the collected used wash fluid is delivered to the pump 31 and pumped to the reclaim tank 15 of the first movable support frame 10.

Although the present invention has been described with reference to the exemplary embodiments outlined above, it should be appreciated that many alternatives and modifications would be readily apparent to one of ordinary skill in the art. Accordingly, the scope of the protection sought by the grant of Letters Patent is defined by the claims appended hereto.

What is claimed is:

1. A system for dispensing, collecting, and processing wash fluid, comprising:
    a first movable support frame, the first movable support frame including a first tank that stores clean wash fluid, a first pump that pressurizes the clean wash fluid and delivers the pressurized wash fluid to at least one dispenser, a second tank that stores used wash fluid, a separator unit and a reverse osmosis unit that process used wash fluid from the second tank into clean wash fluid; and
    a second movable support frame, the second movable support frame including a used wash fluid collection area, a second pump at one end, and an inclination adjustment mechanism that adjusts the inclination of the second movable support frame so that the collected wash fluid is supplied to the second pump.

2. The system according to claim 1, wherein the first movable support frame further comprises a third pump that pressurizes wash fluid from the separator unit to the reverse osmosis unit.

3. The system according to claim 2, wherein the first movable support frame includes a generator that powers the third pump.

4. The system according to claim 1, wherein the first movable support frame further comprises a generator that powers the first pump.

5. The system according to claim 1, wherein the separator unit includes filters coated with amorphous iron oxide.

6. The system according to claim 1, wherein the first tank includes a fresh water tank and a detergent drum.

7. The system according to claim 1, wherein the second pump pumps used wash fluid to the second tank.

8. The system according to claim 1, wherein the second pump is a self activated pump.

9. The system according to claim 1, wherein the second pump and the inclination adjustment mechanism are provided on a same side of the second movable support frame.

10. The system according to claim 1, wherein the second pump and the inclination adjustment mechanism are provided on opposite sides of the second movable support frame.

11. A method for dispensing, collecting, and processing wash fluid, comprising:
    dispensing clean wash fluid from a first movable support frame;
    collecting used wash fluid in a collection area of a second movable support frame;
    adjusting an inclination of the second movable support frame;
    transferring the used wash fluid from the second movable support frame to the first movable support frame; and
    processing the used wash fluid into clean wash fluid on the first movable support frame.

12. The method according to claim 11, wherein dispensing clean wash fluid further comprises pressurizing the clean wash fluid and delivering the pressurized clean wash fluid to at least one dispenser.

13. The method according to claim 12, wherein pressurizing the clean wash fluid further comprises mixing fresh water and detergent.

14. The method according to claim 11, wherein transferring the used wash fluid further comprises pumping the used wash fluid.

15. The method according to claim 11, wherein processing the used wash fluid further comprises filtering the used wash fluid.

16. The method according to claim 15, wherein filtering the used wash fluid further comprises filtering the used wash fluid through at least one of coalescing plates, a polypropylene filter, a charcoal filter and a glass foam filter coated with amorphous iron oxide.

17. The method according to claim 15, wherein filtering the used wash filter further comprises skimming the filtered used wash fluid.

18. The method according to claim 11, wherein dispensing clean wash fluid further comprises dispensing wash fluid processed into clean wash fluid from used wash fluid.

* * * * *